United States Patent [19]

Baker et al.

[11] Patent Number: 4,631,068
[45] Date of Patent: Dec. 23, 1986

[54] REMOVAL OF SULFUR FROM AQUEOUS SUSPENSION USING FILTRATION

[75] Inventors: Roy A. Baker; Rocky C. Costello, both of Houston, Tex.; Michael J. Engel, White Plains, N.Y.

[73] Assignee: Stauffer Chemical Company, Westport, Conn.

[21] Appl. No.: 756,156

[22] Filed: Jul. 18, 1985

[51] Int. Cl.⁴ .......................................... C01B 17/027
[52] U.S. Cl. ................................ 23/293 S; 23/313 R; 210/702; 210/767; 210/DIG. 5; 423/578 R
[58] Field of Search ............... 23/293 S, 308 S, 313 R; 210/702, 767, 773, DIG. 5; 423/578 R

[56] References Cited

U.S. PATENT DOCUMENTS

| | | | |
|---|---|---|---|
| 2,215,969 | 9/1940 | Heinsberg | 210/702 |
| 2,731,332 | 1/1956 | Ackert et al. | 422/262 |
| 3,447,962 | 6/1969 | Megowen | 23/313 R |
| 3,951,814 | 4/1976 | Krueger | 210/DIG. 5 |
| 4,057,493 | 11/1977 | Davies et al. | 210/DIG. 5 |
| 4,083,778 | 4/1978 | McGrew | 210/DIG. 5 |
| 4,129,500 | 12/1978 | Jeffreys et al. | 210/DIG. 5 |
| 4,289,627 | 9/1981 | Disselbeck et al. | 210/702 |
| 4,335,001 | 6/1982 | Aurelle et al. | 210/DIG. 5 |
| 4,454,101 | 6/1984 | Garrison et al. | 210/702 |

FOREIGN PATENT DOCUMENTS

| | | | |
|---|---|---|---|
| 4724 | 10/1979 | European Pat. Off. | 210/DIG. 5 |
| 142512 | 11/1980 | Japan | 210/767 |
| 29098 | 2/1984 | Japan | 210/767 |
| 987132 | 3/1965 | United Kingdom | 210/DIG. 5 |
| 128610 | 3/1960 | U.S.S.R. | 23/308.5 |

Primary Examiner—David L. Lacey

[57] ABSTRACT

There is disclosed a process for the removal of sulfur from an aqueous sulfur-containing suspension through sulfur coalescence. Sulfur coalescence is initiated by passing the aqueous sulfur-containing suspension through a multi-passage filtering media. In one embodiment of the present invention, the aqueous sulfur-containing suspension is passed through a filtering media comprised of randomly oriented fibrous filter material. In another embodiment of the present invention, the aqueous sulfur containing suspension is passed through sintered metal filters. Optionally, downstream polishing, or filtration, steps using either the above enumerated filters or combinations of the above filters can also be used.

12 Claims, 1 Drawing Figure

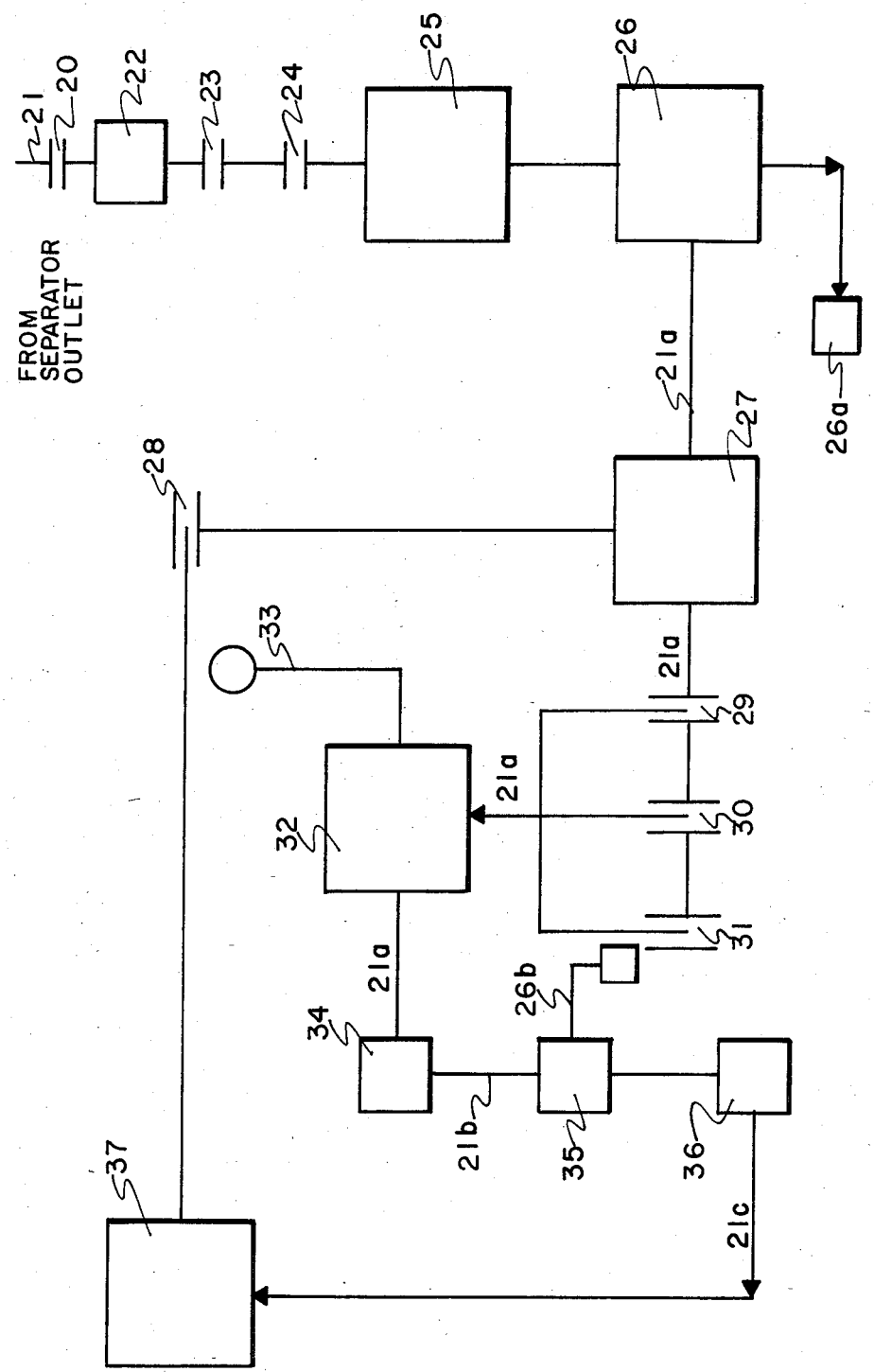

REMOVAL OF SULFUR FROM AQUEOUS SUSPENSION USING FILTRATION

FIELD OF THE INVENTION

The present invention relates to an improved process for the removal of sulfur from an aqueous medium.

BACKGROUND OF THE INVENTION

As a consequence of industrial gas refining operations, oil distillation and ore refining operations, an aqueous stream containing large quantities of sulfur is generated. Existing environmental, as well as economic, considerations dictate that the sulfur be removed so as to either recycle the aqueous medium, minimize the amount of sulfur discharged into the atmosphere or recover the sulfur for commercial use. A number of processes for the removal of sulfur from an aqueous medium by melting and separation have been reported.

In U.S. Pat. No. 4,158,039, there is disclosed a pressure vessel for separating sulfur from an aqueous suspension wherein the vessel is divided into an upper portion containing a heating and stirring device and a lower portion which serves as a settling chamber.

In U.S. Pat. No. 4,206,181, there is disclosed a pressure relief vessel wherein the separation process in the outer annular chamber is increased without actually increasing the diameter of the chamber by providing a ring of inclined separator plates within the outer annular chamber.

An ore refining process wherein sulfur coalescence is achieved by passing the ore suspension first through a funnel to bring the sulfur prills closer together and then through a single passage screen to coalesce the sulfur prills is disclosed in U.S. Pat. No. 3,649,217.

A continuous filter apparatus for removing sulfur from an aqueous suspension is disclosed in U.S. Pat. No. 2,731,332.

Similarly, the use of a porous filter bed to remove sulfur from sulfur-containing ore is disclosed in U.S. Pat. No. 3,689,226.

The problem with the above processes is that they do not remove very small sulfur particles with colloidal properties.

SUMMARY OF THE INVENTION

In accordance with the present invention, there is disclosed a process for the removal of sulfur from an aqueous suspension which comprises passing the aqueous suspension through a filtering means comprised of a multi-passage filter material. Passage of the suspension through the multi-passage filtering means initiates coalescence of the finely dispersed sulfur suspension into larger droplets so that the sulfur can be more easily separated out from the aqueous suspension by appropriate means such as gravity settling.

BRIEF DESCRIPTION OF THE DRAWINGS

The FIGURE illustrates a flow diagram comprising an embodiment of the process of the current invention.

DETAILED DESCRIPTION OF THE INVENTION

The present invention is directed to an improved process for the removal of finely dispersed molten sulfur from an aqueous suspension through the initiation of sulfur coalescence. The process of the present invention may be used for coalescing sulfur from any medium in which the sulfur is present in very fine form in an aqueous suspension. Such aqueous suspensions can be generated, for example, as a result of ore refining operations, petroleum distillation and processes for the sweetening of sour natural gas. The present invention is particularly suited for the removal of sulfur from an aqueous suspension generated as a result of processing natural gas through an AQUACLAUS ® process.

The AQUACLAUS ® process is described in U.S. Pat. No. 3,911,093 to Sherif et al., the material therein being incorporated by reference. In the above process, the aqueous suspension generated contains, in addition to sulfur, ionic species such as, for example, thiosulfates and polythionates. Because of the ionic nature of the suspension, the sulfur droplets are finely dispersed throughout the aqueous medium as a result of the zeta potential surrounding each sulfur particle. The term "zeta potential" refers to the dual layer of charges resulting from the charges derived from the sulfur particles themselves and the charges resulting from the solute in which the particles are suspended. A process for achieving higher loadings of $SO_2$ into the aqueous phosphate absorbent used in the AQUACLAUS ® process is described in U.S. Pat. No. 4,519,994 to Smalheiser, said material being incorporated by reference herein. Ionically dispersed sulfur suspension formed as a result of using this technique can also be used in the present invention.

The present invention will now be described in relation to the coalescence of sulfur from an aqueous suspension generated as a result of an AQUACLAUS ® process although it is to be understood that the present invention is suitable for the coalescence of sulfur from aqueous suspensions generated as a result of ore refining operations, petroleum distillation operations, and the like.

In the present invention, it has been found that sulfur coalescense can be initiated by passage through a mutli-passage filtering means. By "multi-passage" is meant that each individual sulfur droplet contacts the filtering material a number of times before finally exiting the filter material. Examples of multi-passage filtering material which can be used in the present invention include randomly oriented fibrous filter material and sintered metal filters.

In one embodiment of the present invention, the aqueous sulfur-containing suspension is passed through a filtering means containing randomly oriented fibers. After passage through this filter material, the sulfur in the suspension, instead of being present in very fine, finely dispersed form, is coalesced into sulfur drops. Due to the size and weight of the drops, the sulfur can then be easily removed by passing the aqueous suspension into a convenient vessel wherein the sulfur drops can be removed by gravity settling. While the exact mechanism through which the randomly oriented fibrous filter material causes the sulfur coalescence is not known, it is theorized, without such theory forming any part of the present invention, that the zeta potential of the very fine drop is destroyed, or at least partially destroyed, upon passage through the randomly oriented fibrous filter material.

After passage through the randomly oriented fibrous filter material the aqueous suspension now contains sulfur in the form of large colloids. The suspension then passes to a suitable vessel wherein the large colloids can be removed by gravity settling.

The randomly oriented fibrous filter material used in the present invention can be comprised of any suitable material including polyester, polypropylene, nylon, NOMEX ® brand nylon, and TEFLON ® brand polytetrafluoroethylene. Particularly suited for the process of the present invention are those bag filters manufactured by Rosedale Manufacturing Company. If the filter used is of the bag type, the randomly oriented fibrous bulk material within the bag filter can provide a nominal pore size ranging from about 0.5 to about 10 microns.

In another embodiment of the present invention, it has also been found that the molten sulfur present in very fine droplets in the aqueous suspension can also be coalesced by passage through filters of the sintered metal type. The nominal pore size of the sintered metal filters can range from about 1 to about 10 microns. Upon passage through the sintered metal filters, the molten sulfur, which had been in very fine form in the aqueous suspension, is now coalesced.

While slight pressure drops may be seen upon passage of the aqueous suspension through the randomly oriented fibrous filter material, such pressure drops can be compensated by using a vessel for each filter and manifolding to allow cleaning or replacing individual bag filters while on line.

In the embodiment of the invention wherein sintered metal filters are used, it has been found that steam backwashing is effective in lowering the pressure drop across the sintered metal filters.

Utilizing the processes of the current invention, upwards of from 60 to 80 percent of the sulfur in an aqueous suspension may be removed through sulfur coalescence. If additional polishing, or filtration, is needed, the present invention also contemplates the use of additional downstream polishing steps.

In one embodiment, the aqueous suspension is first passed through the randomly oriented fibrous filter material wherein 60 to 80 percent of the sulfur is removed through coalescence. The aqueous suspension is then passed through sintered metal filters. The pore size of the sintered metal filters used can range from about 0.5 to about 10 microns. It has also been found that steam backwashing is effective in lowering the pressure drop across the sintered metal filters.

In another embodiment, the aqueous suspension is first passed through the sintered metal filters wherein 60 to 80 percent of the sulfur is removed through coalescence. The aqueous suspension is then passed through randomly oriented fibrous filter material. The randomly oriented fibrous filter material may be comprised of any previously described material. Any pressure drops seen upon passage of the aqueous suspension through the polishing steps using the bag filters can be compensated by using a vessel for each filter and manifolding to allow cleaning or replacing individual bag filters while on line.

Combinations of the above filtering means may also be used in the present invention. For example, the aqueous sulfur suspension can be sequentially passed through a sintered metal filter and a randomly oriented fibrous filter material.

The temperature at which the processes are run is kept above the melting point of sulfur. Suitable temperatures can range from about 125° to about 150° C. The flow rates of the processes can range from about 1 to 25 gpm/ft$^2$.

The process can be better understood by reference to the FIGURE.

From the FIGURE, it can be seen that an aqueous sulfur-containing suspension 21, at a temperature of from about 125° to about 150° C. generated as a result of, for example, an AQUACLAUS ® process, is passed through separator outlet 20. If visual observation is desired, aqueous sulfur-containing suspension 21 can pass through observation vehicle 22 comprised of a translucent material such as glass or high temperature plastic. Samples can also be taken of aqueous sulfur-containing suspension 21 at observation vehicle 22 so that the initial ppm of sulfur in aqueous sulfur-containing suspension 21 may be calculated.

From observation vehicle 22, the aqueous sulfur-containing suspension 21 then passes through a series of valves 23 and 24 and then through multi-passage filtering means 25 which can either be a randomly oriented fibrous filter material or a sintered metal filter. Multi-passage filtering means 25 can also be comprised of a number of filtering means comprised of randomly oriented fibrous filter material or sintered metal filters arranged in series or in parallel.

After passage through randomly oriented filtering means 25, aqueous sulfur-containing suspension 21 now contains sulfur in the form of large drops. The aqueous sulfur-containing suspension 21 then passes to gravity settling vehicle 26 wherein the large sulfur drops are allowed to settle. The settled-out sulfur can then be removed through sulfur drain 26a. After the sulfur has settled out or has been otherwise removed, the aqueous suspension 21a, now depleted of 60 to 80 percent of the sulfur, then passes through observation vehicle 27 wherein the clarity of the aqueous suspension 21a can be observed and samples can be removed.

If enough sulfur has been removed, the aqueous suspension 21a can then be recirculated via valve 28 to downstream processing section 37 to be recirculated.

In the event that a final polishing step is needed, the aqueous suspension 21a can then flow through any one of a series of valves 29, 30 or 31 through polishing means 32 which may be a sintered metal filter or a series of sintered metal filters 32, or a series of randomly oriented fibrous filter materials. To insure low pressure drops if sintered metal filters are used, sintered metal filter or filters may have attached a steam backwashing system 33.

After aqueous suspension 21a has been further polished, it then passes to observation vehicle 34 wherein visual observations may be made or samples may be extracted for residual sulfur analysis. From observation vehicle 34, the aqueous suspension 21b now containing large colloidal aggregates of sulfur can then pass to another gravity settling chamber 35 wherein additional sulfur may be collected in sulfur drain 26b. If desired, another observation vehicle 36 may be added to insure that all the sulfur has been removed.

The now clear mother liquor 21c than passes through the downstream processing section 37 well known to those skilled in the art wherein the mother liquor may be recirculated.

Having described the invention in general terms, reference is now made to specific examples thereof.

EXAMPLE 1

In this example, a sulfur-containing aqueous suspension generated as a result of an AQUACLAUS ® process is passed through a random fiber bag filter and then through a sintered metal filter. Visual observations were made by using sight glasses (SG) and observations were recorded on a scale of 1 to 3 with 0 being crystal clear and 3 being very cloudy. Sulfur (S) ppm in and sulfur ppm out were also measured. The results are summarized in TABLE I.

TABLE I

| | | BAG FILTER | | | | | | | | |
|---|---|---|---|---|---|---|---|---|---|---|
| Running Time (Hrs) | Flow Rate (GPM) | SG-1 | P in PSI | P out PSI | Delta P PSI | $T_1$ °C. | $T_2$ °C. | SG-2 | S in ppm | S out ppm |
| 5 | 5.5 | 3 | 62 | 56 | 6 | 130° C. | 130° C. | 0 | 338 | 58 |

| | | SINTERED METAL | | | | | | |
|---|---|---|---|---|---|---|---|---|
| Running Time (Hrs) | Flow Rate (GPM) | P in psi | P out psi | Delta P psi | T | SG-1 | S in ppm | S out ppm |
| 5 | 5.5 | 54 | 49 | 5 | 130° C. | 0 | 58 | 13 |

EXAMPLE 2

This Example shows the effect of running the aqueous sulfur-containing suspension through the sintered metal filters alone. The results are summarized in TABLE II.

TABLE II

| SINTERED METAL FILTER PERFORMANCE | | | | | | | |
|---|---|---|---|---|---|---|---|
| Run # | Duration Hrs. | Element Microns | Rate GPM | T °C. | Delta P | S in ppm | S out ppm | % Removal |
| 1 | 5 | 7 | 4.1 | 129 | 17 | 238 | 65 | 69 |
| 2 | 4.5 | 7 | 5.5 | 129 | 18 | 249 | 73 | 70.5 |
| 3 | 2 | 1 | 4.1 | 128 | 10 | 194 | 49 | 73 |
| 4 | 2 | 1 | 2.8 | 127 | 8 | 172 | 63 | 64 |
| 5 | 1.5 | 1 | 5.5 | 128 | 20 | 166 | 60 | 65 |
| 6 | 1 | 7 | 2.8 | 134 | 25 | 211 | 77 | 64 |

Additional features of the preferred and most preferred embodiments of the present invention are found in the claims hereinafter.

What is claimed is:

1. A process for initiating the coalescence of sulfur from an aqueous sulfur-containing suspension above the melting point of sulfur which comprises passing said sulfur-containing aqueous suspension through at least one filter means comprised of a multi-passage filter material to initiate the coalescence.

2. The process of claim 1 wherein said multi-passage filter material is a randomly oriented fibrous filter material.

3. The method of claim 2 wherein said randomly oriented fibrous filter material is comprised of polyester.

4. The method of claim 2 wherein said randomly oriented fibrous filter material has a pore size of from about 0.5 to about 10 microns.

5. The method of claim 2 wherein said randomly oriented fibrous filter material is in the form of a bag filter.

6. The method of claim 1 wherein said multi-passage filter material is sintered metal.

7. The method of claim 6 wherein said sintered metal has a pore size ranging from about 0.5 to about 10 microns.

8. The method of claim 1 wherein said aqueous sulfur-containing suspension contains, in addition to sulfur, additional ionic species such as thiosulfates and polythionates, said ionic species forming part of a solvent system generating a zeta potential around each individual sulfur drop, thereby creating a finely dispersed sulfur-containing suspension.

9. The method of claim 1 further comprising a downstream filtering step.

10. The method of claim 9 wherein the downstream filtering step is performed by passing the aqueous suspension through sintered metal filters.

11. The method of claim 9 wherein the downstream filtering step is performed by passing the aqueous sulfur-containing suspension through a randomly oriented fibrous filter material.

12. The method of claim 9 wherein the downstream filtering step is performed by passing the aqueous suspension through filtering means comprising a combination of sintered metal filters and randomly oriented fibrous filter material.

* * * * *